United States Patent
Halliday et al.

(10) Patent No.: US 10,571,583 B2
(45) Date of Patent: Feb. 25, 2020

(54) SEISMIC INTERFEROMETRY FOR GRAND ROLL AND NOISE ATTENUATION

(75) Inventors: David Fraser Halliday, Cherry Hinton (GB); Julian Edward Kragh, Great Bardfield (GB); Filippo Broggini, Zurich (CH)

(73) Assignee: WESTERNGECO L.L.C., Houston, TX (US)

( * ) Notice: Subject to any disclaimer, the term of this patent is extended or adjusted under 35 U.S.C. 154(b) by 633 days.

(21) Appl. No.: 14/009,760

(22) PCT Filed: Mar. 30, 2012

(86) PCT No.: PCT/IB2012/051553
§ 371 (c)(1),
(2), (4) Date: Dec. 16, 2013

(87) PCT Pub. No.: WO2012/137117
PCT Pub. Date: Oct. 11, 2012

(65) Prior Publication Data
US 2014/0324357 A1    Oct. 30, 2014

(30) Foreign Application Priority Data

Apr. 4, 2011    (GB) .................... 1105627.2

(51) Int. Cl.
*G01V 1/28*    (2006.01)
*G01V 1/20*    (2006.01)
*G01V 1/36*    (2006.01)

(52) U.S. Cl.
CPC ............ *G01V 1/28* (2013.01); *G01V 1/20* (2013.01); *G01V 1/282* (2013.01); *G01V 1/36* (2013.01); *G01V 2210/32* (2013.01); *G01V 2210/3246* (2013.01)

(58) Field of Classification Search
CPC . G01V 1/28; G01V 1/282; G01V 1/36; G01V 1/20; G01V 2210/32; G01V 2210/3246
See application file for complete search history.

(56) References Cited

U.S. PATENT DOCUMENTS

| | | | |
|---|---|---|---|
| 6,253,157 | B1 | 6/2001 | Krebs |
| 6,594,585 | B1 | 7/2003 | Gersztenkorn |
| 6,989,905 | B2 | 1/2006 | De Groot |
| 8,417,458 | B2 | 4/2013 | Halliday et al. |
| 8,441,890 | B2 | 5/2013 | Halliday et al. |
| 2003/0130796 | A1 | 7/2003 | Wiggins |
| 2005/0065731 | A1 | 3/2005 | Mittet |
| 2007/0104028 | A1 | 5/2007 | van Manen et al. |
| 2009/0040870 | A1 | 2/2009 | Kamata |

(Continued)

OTHER PUBLICATIONS

Combined Search and Examination Report of British Application No. GB1105627.2 dated Jul. 18, 2011: pp. 1-5.

(Continued)

*Primary Examiner* — Mohamed Charioui
*Assistant Examiner* — Jeremy Delozier (57) ABSTRACT

Methods of acquiring and processing seismic data using derivative sensors, such as strain sensors, that facilitate ground roll noise attenuation with seismic interferometry are disclosed. The methods use both seismic data and their spatial derivatives in computing ground-roll noises which are removed from processed seismic data.

12 Claims, 6 Drawing Sheets

(56) References Cited

U.S. PATENT DOCUMENTS

| | | | |
|---|---|---|---|
| 2010/0195439 | A1 | 8/2010 | Muyzert |
| 2011/0044132 | A1 | 2/2011 | Halliday et al. |
| 2011/0046886 | A1* | 2/2011 | Halliday .................. G01V 1/36 702/17 |
| 2011/0069581 | A1* | 3/2011 | Krohn .................... G01V 1/364 367/43 |
| 2011/0292763 | A1* | 12/2011 | Coates .................... E21B 47/01 367/25 |
| 2012/0026834 | A1* | 2/2012 | Muyzert .................. G01V 1/20 367/58 |

OTHER PUBLICATIONS

International Search Report of PCT Application No. PCT/IB2012/051553 dated Nov. 30, 2012: 1-3.

Curtis et al., "Virtual seismometers in the subsurface of the Earth from seismic interferometry," Nature Geoscience, Oct. 2009, vol. 2: pp. 700-704.

Curtis et al., "Abstract #S23D-02: Chicken or Egg? Turning Earthquakes into Virtual Seismometers," American Geophysical Union Fall Meeting, 2008: p. 1.

Curtis, Source-Receiver Seismic Interferometry, SEG Houston International Exposition and Annual Meeting, 2009: pp. 3655-3659.

Dong et al., "Interferometric Prediction and Least Squares Subtraction of Surface Waves," SEG/New Orleans Annual Meeting, 2006: pp. 2783-2786.

Groenenboom et al., "Attenuation, dispersion, and anisotropy by multiple scattering of transmitted waves through distributions of scatterers," J. Acoust. Soc. Am., Dec. 1995, vol. 98(6): pp. 3482-3492.

Halliday et al., "Interferometric surface-wave isolation and removal," Geophysics, Sep.-Oct. 2007, vol. 72 (5): pp. A69-A73.

Halliday et al., "Seismic surface waves in a suburban environment: Active and passive interferometric methods," The Leading Edge, Feb. 2008: pp. 210-218.

Halliday et al., "Interferometric ground-roll removal: Attenuation of scattered surface waves in single-sensor data," Geophysics, Mar.-Apr. 2010, vol. 75(2): pp. SA15-SA25.

Halliday, "Chapter 8: Surface Wave Interferometry," University of Edinburgh Thesis, 2009: 167-188.

Ramirez et al., "The role of the direct wave and Green's Theorem in seismic interferometry and spurious multiples." SEG/San Antonio Anual Meeting, 2007: pp. 2471-2475.

Snieder, "hapter 1.7.3: Scattering of Surface Waves," Scattering and Inverse Scattering in Pure and Applied Science, Eds. Pike et al., Academic Press: San Diego, 2002: pp. 562-577.

Van Manen et al., "Modeling of Wave propagation in Inhomogeneous Media," Physical Review Letters, Apr. 2005, vol. 94: pp. 164301-1-164301-4.

Vasconcelos et al., "Representation theorems and Green's function retrieval for scattering in acoustic media," Physical Review E, 2009, vol. 80: pp. 036605-1-036605-14.

Vasconcelos et al., "Interferometry by deconvolution, Part 1—Theory for acoustic waves and numerical examples," Geophysics, May-Jun. 2008, vol. 73(3): pp. S115-S128.

Vasconcelos et al., "Interferometry by deconvolution, Part 2—Theory for elastic waves and application to drill-bit seismic imaging," Geophysics, May-Jun. 2008, vol. 73(3): pp. S129-S141.

Wapenaar et al., "Green's function representations for seismic interferometry," Geophysics, Jul.-Aug. 2006, vol. 71(4): pp. SI33-SI46.

Wapenaar et al., "Seismic and electromagnetic controlled-source interferometry in dissipative media," Geophysical Prospecting, 2008, vol. 56: pp. 419-434.

Yilmaz, "Chapter 6.2: Frequency-Wavenumber Filtering," Seismic Data Analysis, vol. 1, Ed. Stephen M. Doherty, 2001: pp. 898-920.

* cited by examiner

SEISMIC INTERFEROMETRY FOR GRAND ROLL AND NOISE ATTENUATION

CROSS-REFERENCE TO RELATED APPLICATIONS

This application is a U. S. National Stage Application under 35 U.S.C. § 371 and claims priority to Patent Cooperation Treaty Application No. PCT/IB2012/051553 filed Mar. 30, 2012, which claims priority to British Patent Application No. GB1105627.2 filed Apr. 4, 2011. Both of these applications are incorporated herein by reference in their entireties.

BACKGROUND OF THE INVENTION

Embodiments of the present application relate to geophysical exploration for hydrocarbon and other valuable materials and related data processing, more specifically but not by way of limitation, embodiments relate to the use of strain sensors and the data acquired by strain sensors.

Geophysical exploration or seismic exploration in particular involves surveying subterranean geological formations for hydrocarbon deposits or other valuable materials. A survey typically involves deploying source(s) and receivers at predetermined locations. The sources generate waves, which propagate into the geological formations and are changed by their interaction with different geological formations. Part of the waves emitted by the sources reaches the receivers. In response, the receivers generate electrical signals to produce survey data. Analysis of the survey data can then indicate the characteristics of the subterranean geological formations, such as the presence or absence of probable locations of hydrocarbon deposits.

Depending on the location where a survey takes place, there are surveys in sea, on land or in transition zones. Marine seismic surveying is a method for determining the structure of subterranean formations underlying bodies of water. Marine seismic surveying may typically utilize seismic energy sources and seismic receivers located in the water, which may be either towed behind a vessel or positioned on the water bottom from a vessel. The energy source may typically be an explosive device or compressed air system, which generates seismic energy, which then propagates as seismic waves through the body of water and into the earth formations below the bottom of the water. As the seismic waves strike interfaces between subterranean formations, a portion of the seismic waves may be reflected back through the earth and water to the seismic receivers, to be detected, transmitted, and recorded. The seismic receivers typically used in marine seismic surveying may be pressure sensors, such as hydrophones. Additionally, motion sensors, such as accelerometers, may be used. Both the sources and receivers may be strategically repositioned to cover the survey area.

Land seismic surveying is done on land. The energy sources are typically vibratory sources (vibrators). The vibrators produce a pressure signal that propagates through the earth into the various subsurface layers. Here elastic waves are formed through interaction with the geologic structure in the subsurface layers. Elastic waves are characterized by a change in local stress in the subsurface layers and a particle displacement, which is essentially in the same plane as the wavefront. Acoustic and elastic waves are also known as pressure and shear waves. Acoustic and elastic waves are collectively referred to as the seismic wavefield.

Within the data acquired by seismic sensors, in addition to the desired waves reflected from geological structure in the subsurface layers, there are waves going through other paths, which are considered noises. In land seismic survey (and to some extent, seabed seismic surveys), one type of noises is due to the surface waves, or ground-roll noises.

There are many ways attempting to reduce or remove the ground-roll noises, as described in the references cited below. The references [1]-[4] and [6]-[11] describe various aspects of seismic interferometry and their use in seismic industry. Reference [5] describes a number of existing approaches to remove or reduce ground-roll noises, and references [2], [4] and [6] describe existing uses of seismic interferometry to remove or reduce ground-roll noises. None of the existing noise removal methods is perfect. There is still a need to find a better, more efficient way to attenuate noises.

REFERENCES

[1] Curtis, A., H. Nicolson, D. Halliday, J. Trampert, and B. Baptie. Virtual seismometers in the subsurface of the Earth from seismic interferometry. *Nature Geoscience*, 2, 700-704, 2009.

[2] Halliday, D., A. Curtis, P. Vermeer, C. Strobbia, A. Glushcenko, J. O. A. Robertsson D-J. van manen. Interferometric ground-roll removal: Attenuation of direct and scattered surface waves in single-sensor data. *Geophysics*, 75(2), SA15-SA25, 2010.

[3] Halliday, D., and A. Curtis. Seismic interferometry, surface waves, and source distribution. *Geophysical Journal International*, 175, 1067-1087, 2008.

[4] Dong, S., R. He and G. Schuster, 2006. Interferometric prediction and least squares subtraction of surface waves, *76th Annual International Meeting, SEG, Expanded Abstracts*, 2783-2786.

[5] Yilmaz, O., 2001, Seismic Data Analysis, Investigation in Geophysics, No. 10, Tulsa, USA.

[6] Halliday, D., A. Curtis, P. Vermeer, C. Strobbia, A. Glushcenko, J. O. A. Robertsson D-J. van manen. Interferometric ground-roll removal: Attenuation of direct and scattered surface waves in single-sensor data: *Geophysics*, 75, SA15-SA25, 2010.

[7] Vasconcelos, I. R., and R. Snieder, 2008, Interferometry by deconvolution: Part 2—Theory for elastic waves and application to drill-bit seismic imaging: *Geophysics*, 73, S129-S141.

[8] Wapenaar, K, and J. Fokkema. Green's function representations for seismic interferometry. *Geophysics*, 71(4), SI33-SI46, 2006.

[9] Vasconcelos, I. R. and & R. Snieder, 2008. Interferometry by deconvolution, Part 1—Theory for acoustic waves and numerical examples, *Geophysics*, Vol. 73, S115-S128.

[10] Wapenaar, K., E. Slob and R. Snieder, 2008. Seismic and electromagnetic controlled-source interferometry in dissipative media, *Geophysical Prospecting*, 56, 419-434.

[11] van Manen, D.-J., J. O. A. Robertsson and A. Curtis, 2005. Modeling of wave propagation in inhomogeneous media, *Physical Review Letters*, 94, 164301.

BRIEF SUMMARY

Embodiments of the present invention provide methods of using derivative sensors (e.g., sensors that measure certain physical quantities and their horizontal spatial derivatives, for example, a particle velocity and its horizontal derivatives) to overcome the limitations of other seismic sensors. Embodiments of the present invention utilize a combination of traditional seismic data and spatial derivatives thereof to derive accurate estimation of ground roll noises using seismic interferometry. In aspects of the present invention the derived noise may be used to process or reprocess data with very little ground roll noise or processing artifacts.

BRIEF DESCRIPTION OF THE SEVERAL VIEWS OF THE DRAWINGS

A better understanding of the invention can be had when the following detailed description of the preferred embodiments is considered in conjunction with the following drawings, in which.

DETAILED DESCRIPTION OF THE INVENTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

For simplicity, the examples given below and discussions are focused on land seismic survey using vibrators. These examples are for illustration purpose only and are not to limit the applications of the methods described. The methods may be applied to any surveys where ground roll noises are of concern.

Figure 1:
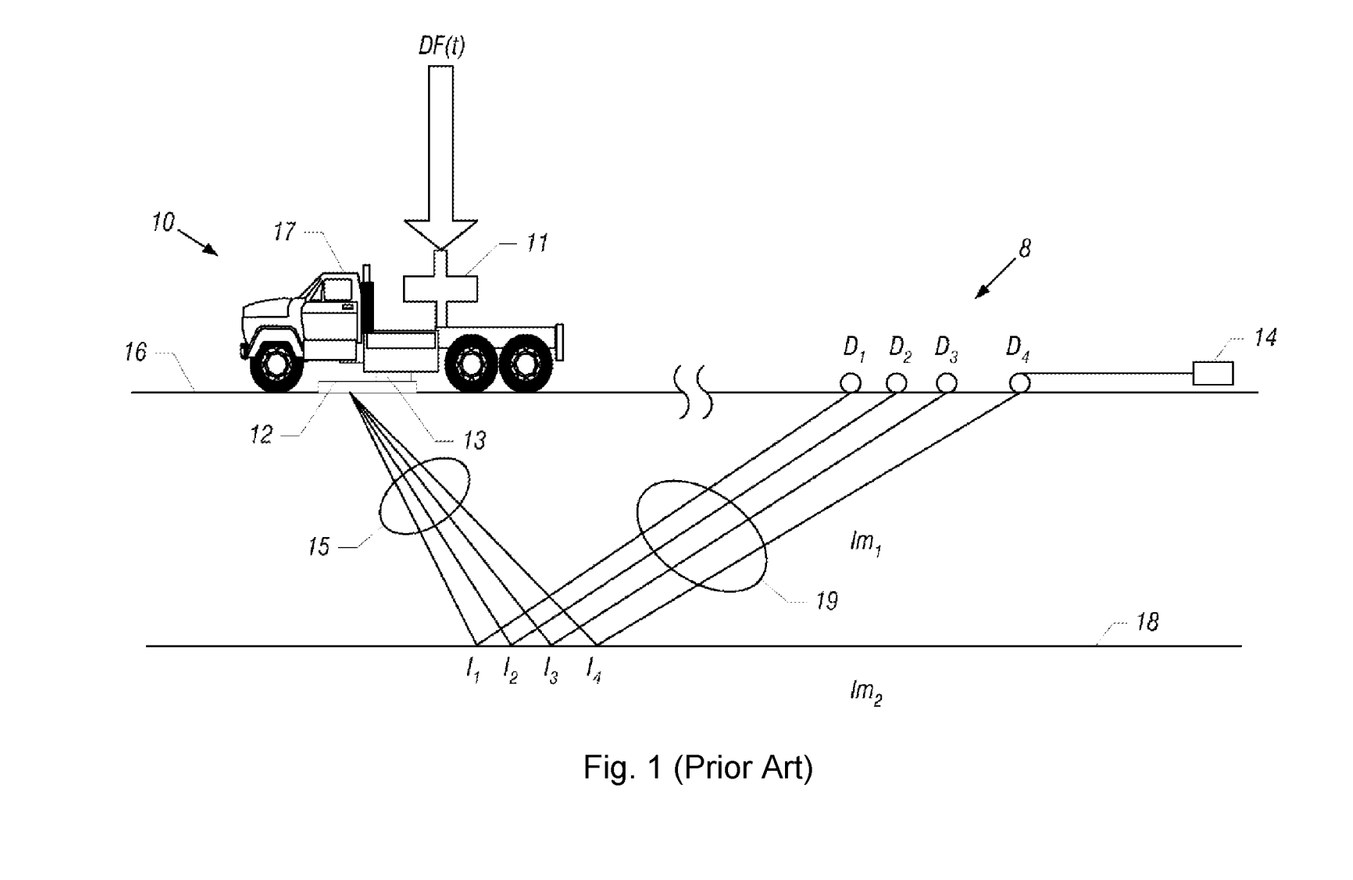
FIG. 1 shows a typical land seismic survey acquisition system.

FIG. 1 depicts a vibroseis acquisition system 8 in a typical land seismic survey as may be found in the prior art. The system may have one seismic vibrator 10 (as depicted in FIG. 1) or multiple seismic vibrators; an array of surface-located seismic sensor units $D_1$, $D_2$, $D_3$ and $D_4$; and a data acquisition system 14. As part of operations associated with a vibroseis survey, the seismic vibrator 10 generates at least one vibroseis seismic sweep. More specifically, FIG. 1 depicts a subsurface sweep signal 15 that is generated by the vibrator 10 during the survey for purposes of injecting a vibroseis sweep into the earth. An interface 18 between subsurface impedances $Im_1$ and $Im_2$ reflects the signal 15 at points $I_1$, $I_2$, $I_3$ and $I_4$ to produce a reflected signal 19 that is detected by seismic sensor units $D_1$, $D_2$, $D_3$ and $D_4$, respectively. The data acquisition system 14 gathers the raw seismic data acquired by the seismic sensor units $D_1$, $D_2$, $D_3$ and $D_4$; and the raw seismic data is processed to yield information about subsurface reflectors and the physical properties of subsurface formations.

For purposes of generating the signal 15, the seismic vibrator 10 may contain an actuator (a hydraulic or electromagnetic actuator, as examples) that drives a vibrating element 11 in response to a sweep pilot signal (called "DF(t)" in FIG. 1). More specifically, the DF(t) signal may be a sinusoid whose amplitude and frequency are changed during the generation of the sweep. Because the vibrating element 11 is coupled to a base plate 12 that is in contact with the earth surface 16, the energy from the element 11 is coupled to the earth to produce the signal 15. Among its other features, the seismic vibrator 10 may also include a signal measuring apparatus 13, which includes sensors (accelerometers, for example) to measure the signal 15 (i.e., to measure the output ground force of the seismic vibrator 10).

As depicted in FIG. 1, the seismic vibrator 10 may be mounted on a truck 17, an arrangement that enhances the vibrator's mobility.

Conventionally, the seismic sensor units may contain particle motion sensors, such as geophones, which record the translational part of the elastic wavefield. This wavefield is typically dominated by slowly propagating ground roll, which masks the weaker near vertical propagating reflections from the subsurface hydrocarbon reservoirs. To attenuate the sensed ground roll, dip or velocity fillers may be applied to the data acquired by the particle motion sensors. Alternatively, conventional seismic sensor units may sense particle motions along three orthogonal axes. With multi-component data, polarization filtering can be applied to help with noise attenuation. Polarization filtering typically relies on the ninety degree phase shift between the horizontal and vertical component of the Rayleigh wave part of the ground roll. However, these methods are still not satisfactory. There are many other attempts to improve the ground-roll noise attenuation.

Rather than using the traditional seismic sensors, such as geophones, hydrophones, accelerometers, measuring single component or multiple components, there is a new type of sensors that can measure earth strain. One such "strain sensor" is described in a pending U.S. patent application assigned to the same assignee of the current application, Ser. No. 12/366,449, publication No. 2010/0195439, published on Aug. 5, 2010, titled "Seismic Acquisition System and Technique", which is incorporated herein by reference for all purposes. This new strain sensor measures both traditional physical quantities (e.g. particle motion or acceleration), and at least one of their spatial derivatives (e.g. in-line or cross-line derivative of particle motion).

A strain sensor typically contains a particle motion sensing element, which measures the vertical component of velocity, and a rotational sensing element, which measure the horizontal rotation rate about a horizontal axis. This measured horizontal rotation rate when measured at the surface is proportional to a tilt rate. The tilt rate, for small values, is proportional to a spatial derivative of the vertical velocity of the surface along the axis. Therefore, a measurement of the horizontal rotation rate at the surface is proportional to a spatial derivative of the vertical velocity.

Figure 2:
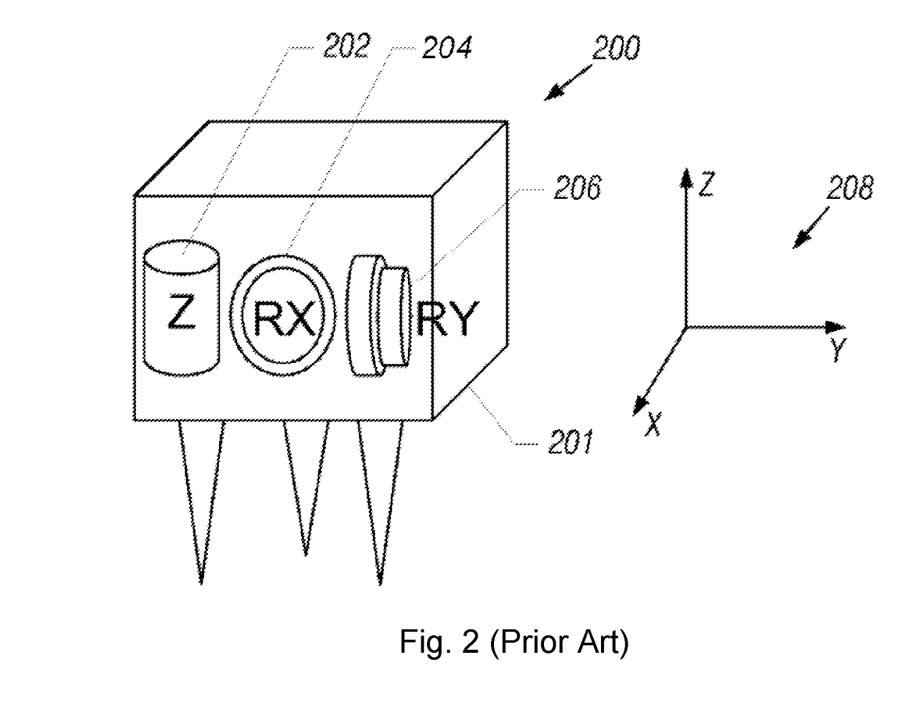
FIG. 2 shows a strain sensor that may be used in methods of this invention.

FIG. 2 illustrates an example of a strain sensor 200. In this example, there are two rotational sensing elements, element 204 along the in-line (x) direction and element 206 along the cross-line (y) direction co-located with geophone element 202 measuring the vertical velocity. Such a strain sensor 200 provides the measurements of the vertical component of velocity, the in-line derivative of the same vertical velocity and the cross-line derivative of the same vertical velocity. In this example, two spatial derivatives of the vertical velocity are measured, but only one is needed for most of the methods described. In this example, only one particle motion sensing element is shown. It can be useful to have three particle motion sensing elements, arranged along three orthogonal directions, as typically present in a 3-component geophone.

An alternative to a strain sensor that can measure the spatial derivative of vertical component of particle motion is to use two (or multiple) geophones that are bundled together. A bundled geophone-pair is two geophones that are place closely spatially (e.g. less than 1 meter or similar apart) along a direction. The data differences between the two geophones in the pair and their known spatial separation can be used to estimate the spatial derivative along the direction between the two geophones. Three bundled geophones can form two orthogonally aligned geophone-pairs, each of which can be used to estimate one of the spatial derivatives in the two orthogonal directions.

The new measurements from derivative sensors, which can be strain sensors or bundled geophones or others, can be applied to enhance seismic survey and data processing. In particular, the spatial derivatives of particle velocity at the surface of the Earth can be used to correctly recover the scattered ground-roll using seismic interferometry in areas where the near-surface of the Earth is strongly heterogeneous. As discussed below, the derivative measurements can be incorporated into the inter-source form of seismic interferometry.

It is shown that by using only vertical-force sources (for example, Vibroseis sources), estimates of direct and scattered ground-roll can be made, in an equation of the form:

$$G_{33}^*(x_2,x_1) - G_{33}(x_2,x_1) \approx \int_{x \in \partial V} \{G_{33}(x,x_2) G_{33}^*(x,x_1)\} dx^2. \quad (1)$$

Figure 3:
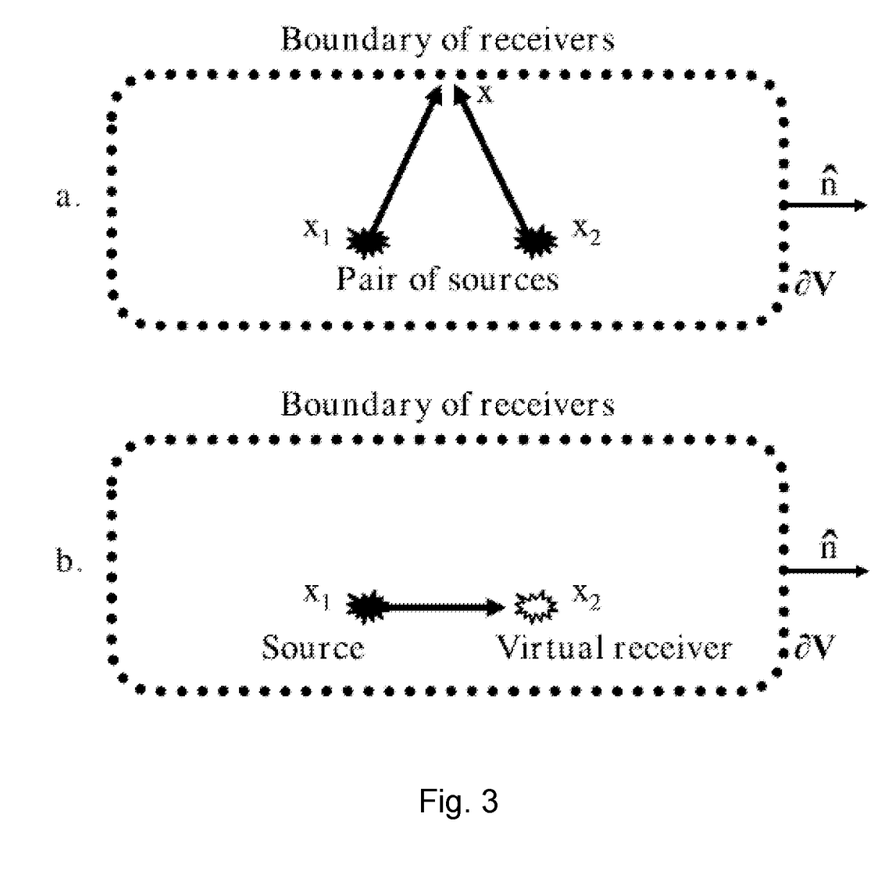
FIG. 3 shows two simple diagrams of source/receiver arrangements within boundaries of receivers, in accordance with an embodiment of the present invention.

Here, also referring to FIG. 3, $G_{33}(x_2,x_1)$ is the Green's function representing the vertical component (i.e. $3^{rd}$ component) of particle displacement at $x_2$ due to a vertical point force (i.e. $3^{rd}$ component) at $x_1$. A Green's function, as referred to here, is a mathematical representation of a wavefield at a location x2 due to a point source at a location x1. The Green's function in Eq. (1) is expressed in its components format, where the two subscripts in $G_{33}$ refer to the components. The subscripts 1, 2 and 3 refer to the X-Y-Z components in the 3D coordinates. The points $x_1$ and $x_2$, are located inside a volume V bound by a surface, $\partial V$ on which the points x are located. * indicates complex conjugation. This expression is in the frequency domain and corresponds to cross-correlation. Similar expressions exist that use convolution or deconvolution in place of the cross-correlation. These approaches to interferometry are very similar in application to the cross-correlation case, and may equally be used to suppress ground-roll noises. Examples of these approaches are discussed in references [6], [7], and [9].

FIG. 3 illustrates the geometry used by a virtual-receiver interferometry technique, in accordance with an embodiment of the present invention. In Part a of FIG. 3, the solid arrows denote the Green's functions propagating between the sources located at $x_1$ and $x_2$ and a receiver located at x, which is on a boundary enclosing the sources. The solid arrow in Part b of FIG. 3 shows the reconstructed Green's function that propagates between the sources, where one of them acts as a virtual receiver. The domain consists of a surface V, bounded by $\partial V$. $\hat{n}$ is the unit vector normal to $\partial V$. The geometry is sketched as if it were placed on the Earth's surface. In this configuration, it is believed that the reconstructed inter-source Green's function is dominated by ground-roll. If when the source at $x_1$ was activated, a receiver was recording at location $x_2$ then the reconstructed Green's function could be subtracted from this recording. This would be used to remove the unwanted ground-roll energy, revealing the underlying signal from the deeper subsurface.

In the form of Equation (1), phase errors and additional amplitude errors are expected in the interferometric surface wave estimates, due to approximations that are made, for example to remove the requirement of spatial derivatives. These approximations are acceptable in some situations. They have been used to predict and subtract ground-roll from seismic data to some extent, where adaptive filters are used to account for phase and amplitude errors (e.g., [4] Dong et al., 2006; [6] Halliday et al., 2010). But in many other more common situations, non-physical arrivals are introduced along with the phase and amplitude errors, and these non-physical arrivals arise due to the presence of scatterers outside of the boundary (see [8] Wapenaar and Fokkema (2006)). These non-physical arrivals may degrade the results of interferometric ground-roll removal.

It is believed that surface waves behave more like 2D acoustic waves. The Green's function for surface-waves in layered media has the same analytic form as the Green's functions in homogeneous 2D media. The key similarities are that the phase and geometric spreading terms are the same. There are of course amplitude differences, which have a frequency dependence. But applying an acoustic form of virtual-receiver interferometry to the elastic surface waves may be adequate to recover the correct phase of both direct and scattered surface waves, and also to mitigate for the effect of scatterers being located outside of the boundary of sources.

The full acoustic interferometric integral in two dimensions can be written as:

$$G^*(x_2,x_1)-G(x_2,x_1) \approx \int_{x \in \partial V}\{G(x,x_2)n_j\partial_j G^*(x,x_1)-n_j\partial_j G(x,x_2)G^*(x,x_1)\}dx^2. \quad (2)$$

It is believed that the surface waves behave in the same manner as 2D acoustic waves and that it is possible to approximate the elastic equation based on its acoustic counterpart; hence we use the following equation to compute our interferometric estimates:

$$G_{33}^*(x_2,x_1)-G(x_2,x_1) \approx \int_{x \in \partial V}\{G_{33}(x,x_2)n_j\partial_j G_{33}^*(x,x_1)-n_j\partial_j G_{33}(x,x_2)G_{33}^*(x,x_1)\}dx^2. \quad (3)$$

Here j=1, 2, and the surface $\partial V$ is understood to be confined to the surface of the Earth. The subscript 33 of the Green's function refers to the fact that sources and receivers inject and record, respectively, in the vertical direction only. This equation is more sophisticated than Equation (1), in that it includes the normal derivatives of the particle velocity (the terms $n_j\partial_j G_{33}(x,x_2)$), and also includes the difference of two correlation products, whereas Equation (1) only requires a single correlation product. We do not expect to recover the true amplitudes, but the phase of the surface waves should be recovered correctly, and scattering outside of the boundary will be treated more properly by the inclusion of the normal derivatives of particle velocity.

These normal derivatives, i.e. spatial derivatives along the normal direction of the boundary, can be measured by the strain sensors mentioned above. Hence, deploying strain sensors along a boundary of survey facilities the use of equations (such as Equation (3)) that improves interferometric estimates of the ground-roll by using spatial derivatives.

By using a method according to Equation (3), use of a sum of two correlation products cancels the unwanted non-physical arrivals in the ground-roll predictions that can introduce artifacts when subtracted from source-to-receiver seismic data. This can greatly improve the processed data quality.

Although the theoretical formulation, as in Equation (3), indicates that the surface $\partial V$ completely encloses the receiver locations, in practice, it is often acceptable to have a limited boundary of receivers (e.g., a single line of receivers, open at either end).

Figure 4:
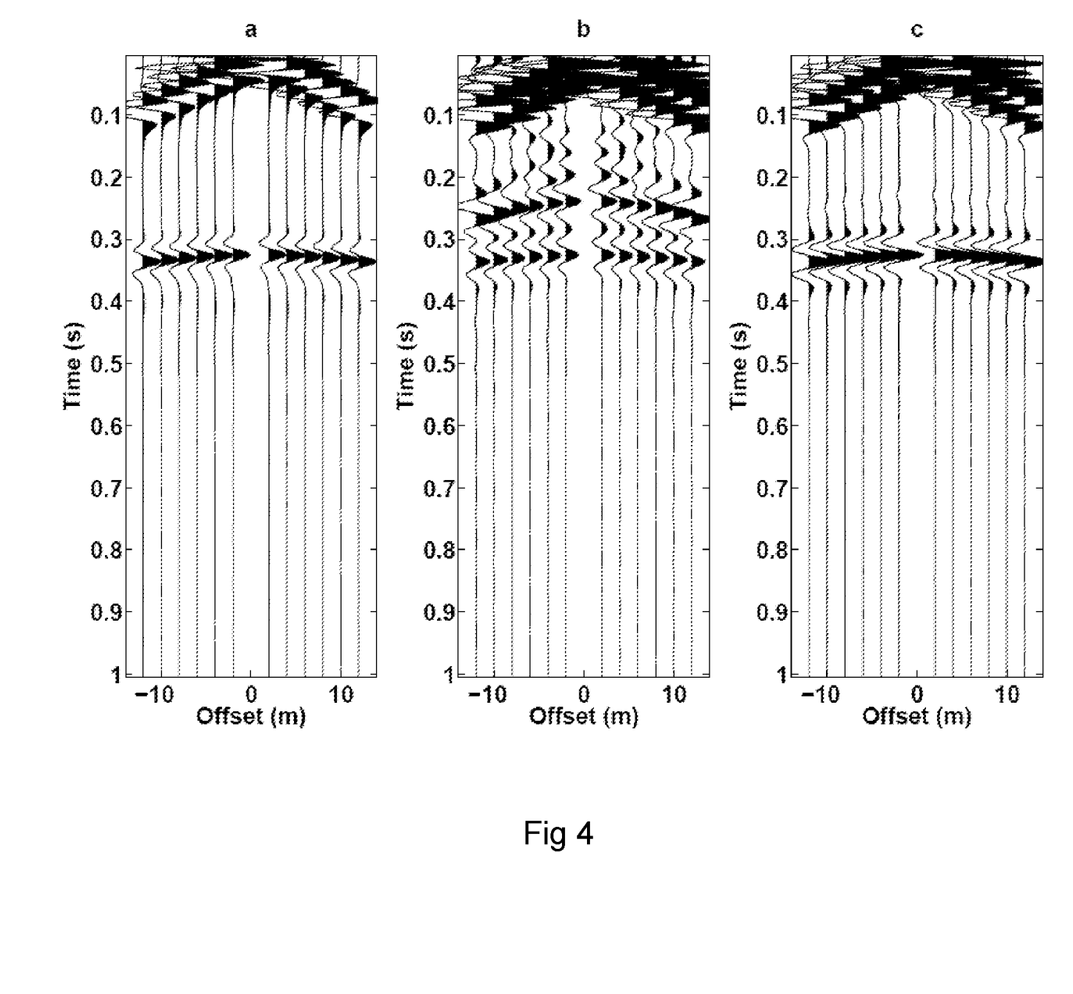
FIG. 4 shows sample data processed with and without the methods of embodiments of the present invention.

FIG. 4 shows a synthetic example, illustrating the benefit of using equations in the form of Equation (3), over those of the form used in Equation (1), in accordance with an embodiment of the present invention. This synthetic example demonstrates the benefit of recording the spatial derivative of the particle velocity when creating estimates of the ground-roll to be used for noise attenuation. The acquisition geometry for this example is similar to that shown in FIG. 3. Panel a shows the exactly computed surface waves for a synthetic model with a single scattering body. In relation with FIG. 3, there is a single source location x1 (offset 0 m) and many collocated source and receiver locations x2. The direct surface wave arrives first (from 0 to 0.15 s) and the scattered surface wave arrives at around 0.3 s. The scattering body is located in a position outside of the surface $\partial V$, hence when applying interferometry using Equation (1) without spatial derivatives, a significant non-physical arrival is introduced as shown in Panel b between 0.2 s and 0.3 s. When using such a wavefield estimate for noise attenuation, the extra arrival will introduce a significant artifact into the seismic data. However, when we create the same estimate according to Equation (3), using both recordings of particle velocity and its spatial derivative, we achieve the results in panel c. The non-physical arrival is almost completely removed, indicating the benefit of using strain sensors when creating noise references using seismic interferometry These improved estimates of the ground-roll are then subtracted from the source-to-receiver seismic data. The ground-roll free data can be further processed with other processing steps.

Figure 5:
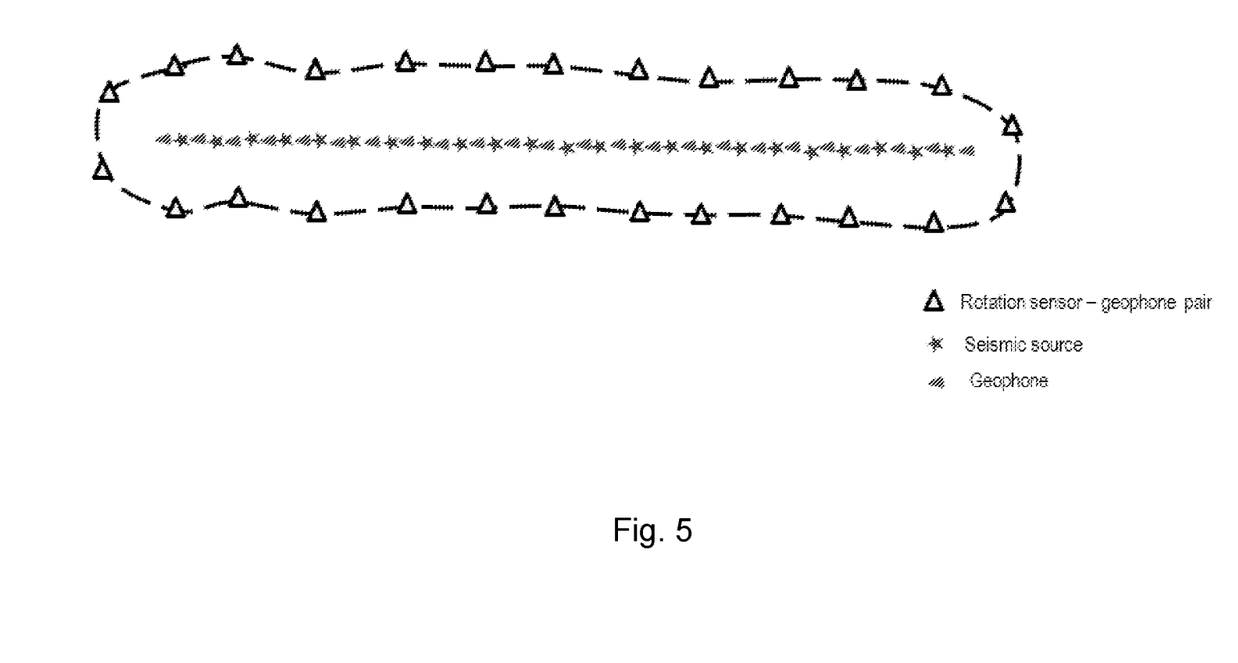
FIG. 5 shows a sample 2D land seismic survey plan according to an embodiment of the present invention.

FIG. 5 shows a sketch of one of the acquisition geometries that may facilitate the removal of ground-roll noise using the method described above, in accordance with embodiments of the present invention. In the example, strain sensors, (also referred to as rotational sensor-geophone pairs in FIG. 5, as denoted by equilateral triangles) are deployed along a boundary to assists in the prediction and subtraction of direct and scattered ground roll. In this case, seismic sources (as denoted by stars) and receivers (e.g. geophones, as denoted by arrows) are laid out in the geometry for a conventional 2D land seismic survey. These extra data from the strain sensors facilitate the prediction and subtraction of the ground-roll using the method described above. The dash line indicates how the strain sensors form a surface similar to $\partial V$ in FIG. 3. For simplicity, only a 2D acquisition geometry is illustrated. The strain sensors are only deployed around the 2D line to form a boundary. As mentioned below, the boundary need not enclose the entire survey area. Some openings in the boundary line are acceptable and the methods described above still work. In this case, strain sensors need not be placed at the ends of the 2D line, but instead only alongside the 2D line. The strain sensors only need to measure the cross-line derivatives, which are the spatial derivatives along the direction normal to the boundary. Except for the additional strain sensors and acquiring data from such sensors, the survey as shown in FIG. 5 can be performed as a traditional land survey. It is noted that the locations for receivers and sources are different as shown in FIG. 5 and in the discussion. This is for the simplicity of discussion. Receivers and sources and their locations are inter-changeable for most methods as should be apparent to a person of ordinary skill of the art.

Once the survey data are acquired, the data from the strain sensors, as in form of vertical velocity and its spatial derivative, can be used in seismic interferometry in the form of Equation (3), instead of Equation (1). This way, some of the approximations used in Equations (1) are not used, and artifacts, especially the non-physical scattering terms can be eliminated, as shown in FIG. 4.

In the methods described above, the use of the strain sensors is in the correlational form of seismic interferometry. Similar results may be achieved using the convolutional form of seismic interferometry.

There are many other seismic interferometric methods where the boundary a V is formed (at least in part) by a number of receivers. For example, a pending U.S. patent application ('428), Ser. No. 12/848,428, Titled "Removing Ground-Roll from Geophysical Data using Source-Receiver Interferometry", filed on 2 Aug. 2010 and another pending U.S. patent application ('534), Ser. No. 12/848,534, Titled "Removing Ground-Roll from Geophysical Data", filed on 2 Aug. 2010, proposed several such methods. Both applications are assigned to the same assignee of the current application. The '428 and '534 applications are incorporated herein by reference for all purposes.

The '428 application disclosed a method for using source-receiver interferometry for scattered ground-roll prediction and removal. The described method includes applying a first interferometry on an estimate of a direct ground roll between a receiver location and one or more boundary source locations and an estimate of a direct ground roll between one or more boundary receiver locations and each boundary source location to generate an interferometric estimate of a direct ground roll between the receiver location and each boundary receiver location. The method then includes applying a second interferometry on geophysical data between the source location and each boundary receiver location and the interferometric estimate of the direct ground roll between the receiver location and each boundary receiver location to generate an interferometric estimate of a direct and scattered ground roll between the source location and the receiver location. After applying the second interferometry, the method then includes removing the interferometric estimate of the direct and scattered ground roll between the source location and the receiver location from geophysical data acquired at the receiver location due to a source at the source.

The '534 application disclosed a related but quite different method, which method is a model-driven. The method of the '534 application includes generating a model from geophysical data acquired at a receiver location and one or more boundary receiver locations. After generating the model, the method applies a forward modeling algorithm using information from the model to generate a modeled estimate of a direct ground roll between the receiver location and each boundary receiver location. The method then estimates a ground roll between a source location and each boundary receiver location. Using the modeled estimate of a direct ground roll between the receiver location and each boundary receiver location and the estimate of the ground roll between a source location and each boundary receiver location, the method applies interferometry between the estimate of the ground roll between the source location and each boundary receiver location and the modeled estimate of the direct ground roll between the receiver location and each boundary receiver location to generate an interferometric estimate of a ground roll between the source location and the receiver location. The method then removes the interferometric estimate of the ground roll between the source location and the receiver location from geophysical data acquired at the receiver location due to a source at the source location.

Both the '428 and '534 applications, as common in other prior art references, use prior art methods in obtaining the inter-source interferometric integrals, which are similar to Equation (1) as discussed above. Therefore, the '428 and '534 methods can be improved if the methods discussed herein are incorporate; for example, including spatial derivatives as in Equation (3) in computing inter-source interferometric integrals. In embodiments of the present invention, both of the approaches of the '428 and '534 applications may be adapt in a similar way to the adaptations of the seismic methods described above, herein.

Other approaches to interferometry exist where a deconvolution, or multi-dimensional deconvolution are used. In accordance with embodiments of the present invention, improvement in results from such approaches can be achieved by formulating the methods of the approaches to utilize seismic data recordings provided by strain sensors.

The data processing portions of methods in accordance with embodiments of the present invention may be implemented in a computer system 1900, one of which is shown in FIG. 5. The system computer 1930 may be in communication with disk storage devices 1929, 1931, 1933 and 1935, which may be external hard disk storage devices. The disk storage devices 1929, 1931, 1933 and 1935 may in certain aspects comprise conventional hard disk drives, and as such, may be implemented by way of a local area network or by remote access. Of course, while disk storage devices are illustrated as separate devices, a single disk storage device may be used to store any and all of the program instructions, measurement data, and results as desired.

In one implementation, seismic data from the seismic receivers may be stored in disk storage device 1931. Various non-seismic data from different sources may be stored in disk storage device 1933. The system computer 1930 may retrieve the appropriate data from the disk storage devices 1931 or 1933 to process data according to program instructions that correspond to implementations of various techniques described herein. The program instructions may be written in a computer programming language, such as C++, Java and the like. The program instructions may be stored in a computer-readable medium, such as program disk storage device 1935. Such computer-readable media may include computer storage media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 1930. Combinations of any of the above may also be included within the scope of computer readable media.

In one implementation, the system computer 1930 may present output primarily onto graphics display 1927, or alternatively via printer 1928 (not shown). The system computer 1930 may store the results of the methods described above on disk storage 1929, for later use and further analysis. The keyboard 1926 and the pointing device (e.g., a mouse, trackball, or the like) 1925 may be provided with the system computer 1930 to enable interactive operation.

Figure 6:
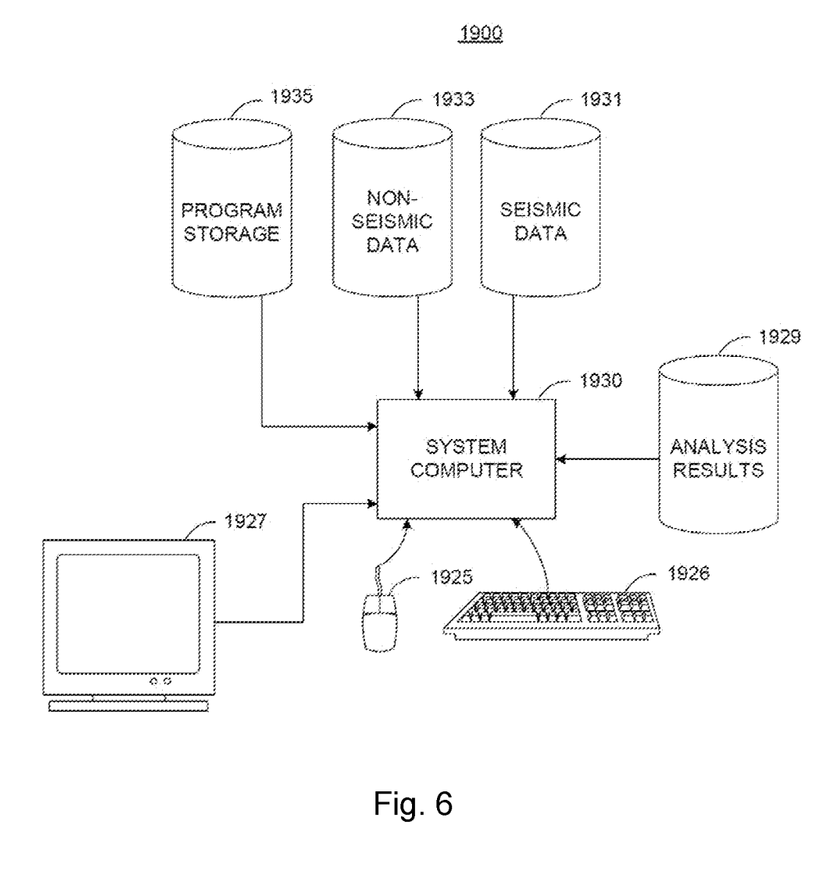
FIG. 6 shows a sample processing system in accordance with an embodiment of the present invention.

The system computer 1930 may be located at a data center remote from an exploration field. The system computer 1930 may be in communication with equipment on site to receive data of various measurements. The system computer 1930 may also be located on site in a field to provide faster feedback and guidance for the field operation. Such data, after conventional formatting and other initial processing, may be stored by the system computer 1930 as digital data in the disk storage 1931 or 1933 for subsequent retrieval and processing in the manner described above. While FIG. 6 illustrates the disk storage, e.g. 1931 as directly connected to the system computer 1930, the disk storage device may in some aspects be accessible through a local area network or by remote access. Furthermore, while disk storage devices 1929, 1931 are illustrated as separate devices for storing input seismic data and analysis results, the disk storage devices 1929, 1931 may be implemented within a single disk drive (either together with or separately from program disk storage device 1933), or in any other conventional manner as will be fully understood by one of skill in the art having reference to this specification.

While illustrative embodiments of the invention have been illustrated and described, it will be appreciated that various changes can be made therein without departing from the scope of the invention.

The invention claimed is:

1. A method of carrying out a seismic survey to acquire seismic data suitable for ground-roll noise attenuation, the method comprising:
   deploying at least one seismic source which is a seismic vibrator at a source location and deploying at least one seismic receiver at a receiver location;
   deploying a plurality of derivative sensors at derivative sensor locations distributed on a boundary, the source location and the receiver location located inside the boundary;
   operating the at least one seismic source to transmit vibrational energy and receiving responses which are vibrational energy at the at least one seismic receiver and the derivative sensors;
   recording data from the at least one seismic receiver and the derivative sensors wherein the data comprises measurements of velocity at the at least one seismic receiver and measurements of velocity and a spatial derivative of velocity at each derivative sensor location;
   computing an interferometric estimate of ground-roll wavefield using two correlation products; and
   removing the computed estimate of ground-roll wavefield from the seismic data.

2. The method of claim 1, wherein each derivative sensor measures a vertical velocity and a spatial derivative of the vertical velocity along a horizontal axis.

3. The method of claim 1, wherein each derivative sensor comprises:
   a strain sensor, which comprises a geophone element measuring a vertical particle velocity and a rotational sensing element measuring a horizontal rotation rate along a horizontal axis;
   two bundled-geophone elements measuring a vertical particle velocity and its derivative; or
   three bundled-geophone elements forming two orthogonally aligned geophone element pairs, measuring a vertical particle velocity and two of its spatial derivatives along the two orthogonal directions.

4. The method of claim 3, wherein the strain sensor further comprises a second rotational sensing element measuring a horizontal rotation rate along a second horizontal axis wherein the second horizontal axis is orthogonal to the other horizontal axis.

5. The method of claim 1, wherein the derivative sensors measure spatial derivatives along a direction normal to the boundary.

6. A method of carrying out a seismic survey, the method comprising:
   deploying at least one seismic source which is a seismic vibrator at a source location and deploying at least one seismic receiver at a receiver location;
   deploying a plurality of derivative sensors at derivative sensor locations distributed on a notional boundary, the source location and the receiver location located inside the boundary;
   operating the at least one seismic source to transmit vibrational energy and receiving responses which are vibrational energy at the at least one seismic receiver and the derivative sensors;
   recording seismic data from the at least one seismic receiver and the derivative sensors wherein the seismic data comprises measurements of velocity at the seismic receiver and measurements of velocity and a spatial derivative of velocity at each derivative sensor;
   computing an interferometric estimate of ground-roll wavefield using both the measurements of velocity and its spatial derivative at the derivative sensors; and
   removing the computed estimate of ground-roll wavefield from the seismic data.

7. The method of claim 6, wherein the step of computing an interferometric estimate of ground-roll wavefield comprises computing two correlation products.

8. The method of claim 6, computing interferometric estimate of ground-roll wavefield comprises computing the interferometric estimate in the form of $$G_{33}^*(x_2,x_1) - G_{33}(x_2,x_1) \approx \int_{x \in \partial V} \{G_{33}(x,x_2) n_j \partial_j G_{33}^*(x,x_1) - n_j \partial_j G_{33}(x,x_2) G_{33}^*(x,x_1)\} dx^2$$

where $j=1, 2$, and $\partial V$ is the boundary,
wherein 33 of the Green's function refers to vertical direction of both source and receiver; and
wherein the terms $n_j \partial_j G_{33}(x, x_2)$ is the normal derivative of vertical velocity along the boundary.

9. The method of claim 6, wherein computing an interferometric estimate of ground-roll wavefield comprises using cross-correlation, deconvolution or multi-dimensional deconvolution.

10. The method of claim 6, further comprising:
    applying a first interferometry on an estimate of a direct ground roll between a receiver location and one or more boundary source locations and an estimate of a direct ground roll between one or more boundary receiver locations and each boundary source location to generate an interferometric estimate of a direct ground roll between the receiver location and each boundary receiver location;
    applying a second interferometry on geophysical data between the source location and each boundary receiver location and the interferometric estimate of the direct ground roll between the receiver location and each boundary receiver location to generate an interferometric estimate of a direct and scattered ground roll between the source location and the receiver location;
    removing the interferometric estimate of the direct and scattered ground roll between the source location and the receiver location from geophysical data acquired at the receiver location due to a source at the source location.

11. The method of claim 6, further comprising:
    generating a model from geophysical data acquired at a receiver location and one or more boundary receiver locations;
    applying a forward modeling algorithm using information from the model to generate a modeled estimate of a direct ground roll between the receiver location and each boundary receiver location;

estimating a ground roll between a source location and each boundary receiver location;

applying interferometry between the estimate of the ground roll between the source location and each boundary receiver location and the modeled estimate of the direct ground roll between the receiver location and each boundary receiver location to generate an interferometric estimate of a ground roll between the source location and the receiver location; and removing the interferometric estimate of the ground roll between the source location and the receiver location from geophysical data acquired at the receiver location due to a source at the source location.

12. A method of carrying out a seismic survey, the method comprising:

deploying at least one seismic source which is a seismic vibrator at a source location and deploying at least one seismic receiver at a receiver location;

deploying a plurality of derivative sensors at derivative sensor locations distributed on a notional boundary, the source location and the receiver location located inside the boundary;

operating the at least one seismic source to transmit vibrational energy and receiving responses which are vibrational energy at the at least one seismic receiver and the derivative sensors;

recording seismic data from the at least one seismic receiver and the derivative sensors wherein the seismic data comprises measurements of velocity at the at least one seismic receiver and measurements of velocity and a spatial derivative of velocity at each derivative sensor;

computing an interferometric estimate of ground-roll wavefield in the form of $$G_{33}^*(x_2,x_1) - G_{33}(x_2,x_1) \approx \int_{x \in \partial V} \{G_{33}(x,x_2) n_j \partial_j G_{33}^*(x,x_1) - n_j \partial_j G_{33}(x,x_2) G_{33}^*(x,x_1)\} dx^2$$

where j=1, 2, and $\partial V$ is the boundary, wherein 33 of the Green's function refers to vertical direction of both source and receiver, and wherein the terms $n_j \partial_j G_{33}(x, x_2)$ is the normal derivative of vertical velocity along the boundary; and removing the computed estimate of ground-roll wavefield from the seismic data.

* * * * *